United States Patent
Fouche'

(10) Patent No.: US 7,336,868 B2
(45) Date of Patent: Feb. 26, 2008

(54) OPTICAL COMPONENT WITH SPECTRAL SEPARATION

(75) Inventor: Jean-Baptiste Fouche', Verrieres le Buisson (FR)

(73) Assignee: Yenista Optics SA, Lannion (FR)

( * ) Notice: Subject to any disclaimer, the term of this patent is extended or adjusted under 35 U.S.C. 154(b) by 0 days.

(21) Appl. No.: 10/491,645

(22) PCT Filed: Oct. 1, 2002

(86) PCT No.: PCT/FR02/03339

§ 371 (c)(1),
(2), (4) Date: Mar. 31, 2004

(87) PCT Pub. No.: WO03/029862

PCT Pub. Date: Apr. 10, 2003

(65) Prior Publication Data

US 2005/0031257 A1    Feb. 10, 2005

(30) Foreign Application Priority Data

Oct. 1, 2001    (FR) .................................. 01 12620

(51) Int. Cl.
*G02B 6/28* (2006.01)
*G02B 6/18* (2006.01)

(52) U.S. Cl. .......................... 385/24; 385/33; 385/124
(58) Field of Classification Search ................ 385/24, 385/33, 34, 36, 37, 43, 47, 123, 124
See application file for complete search history.

(56) References Cited

U.S. PATENT DOCUMENTS

| 4,634,215 A * | 1/1987 | Reule ........................... 385/43 |
| 6,014,483 A * | 1/2000 | Thual et al. ................... 385/33 |
| 6,421,481 B1 * | 7/2002 | Sappey ......................... 385/37 |
| 6,542,665 B2 * | 4/2003 | Reed et al. .................... 385/34 |

FOREIGN PATENT DOCUMENTS

EP    370663 A2 *    5/1990

* cited by examiner

*Primary Examiner*—Sarah Song
(74) *Attorney, Agent, or Firm*—Gerald E. Helget; Briggs and Morgan, P.A.

(57) ABSTRACT

The invention relates to an optical component comprising at least one input monomode fiber (1-4), at least one output monomode fiber (5) and a diffractive element (7) which is disposed between the input fiber or fibers (1-4) and the output fiber or fibers (5). The inventive component is characterized in that at least one of the input or output fibers (1-5) comprises a fiber (1-5) containing a portion (21-25) which is designed to increase the radius of the mode field it guides. According to the invention, the portion which is designed to increase the mode field radius can comprise a portion with a graded index, a portion having a core or cladding refractive index which varies transversely and/or longitudinally.

10 Claims, 2 Drawing Sheets

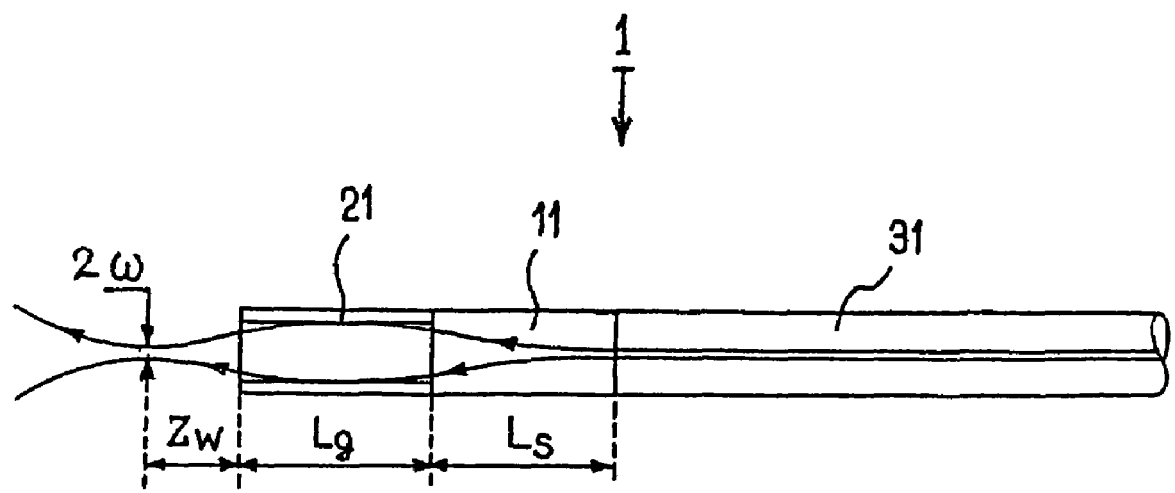
FIG_3

OPTICAL COMPONENT WITH SPECTRAL SEPARATION

BACKGROUND OF THE INVENTION

The invention concerns the field of optical components and more particularly optical wavelength multiplexers and demultiplexers.

The person skilled in the art knows that it is possible to considerably increase the traffic of fiber optic networks through wavelength multiplexing and demultiplexing techniques. Each series of data to be transported is transmitted over a specific optical frequency, multiplying the capacity of the fiber by the number of wavelengths used.

FIG. 1 represents a multiplexer of the prior art. In this type of multiplexer, basic optical fibers 1 to 4 each dedicated to a frequency band have their end in a plane x constituting the input plane of the multiplexer. This multiplexer also comprises a collimation element 6 and a diffractive element 7. The input plane x of the multiplexer is confused with the focal plane of the collimation element 6 so that the input beams coming from the ends of the basic fibers 1 to 4 pass through the collimation element 6 and are located roughly parallel to one another. The diffraction element 7 is positioned so that the beams are sent back toward the collimation element 6, which superimposes them to introduce them at the end of a single output fiber 5.

As the rate of optical networks continues to increase and as the stability of the optical sources, particularly lasers, is not perfect, it is necessary to reduce the transmission fluctuations resulting from this instability by seeking a multiplexing bandwidth that is as wide as possible.

We therefore want to increase the ratio FWHM/$\Delta\lambda$ where FWHM (Full Width at Half Maximum) designates the width of a basic band and $\Delta\lambda$ designates the distance between two central wavelengths of two consecutive basic bands. We know that the ratio FWHM/$\Delta\lambda$ is proportional to the ratio $\omega/\Delta x$, where $\omega$ designates the mode field radius of the fibers and $\Delta x$ designates the spacing between the fibers.

BRIEF DESCRIPTION OF THE INVENTION

One known method for increasing the ratio FWHM/$\Delta\lambda$ therefore consists in using a planar wave guide-based concentrator to reduce $\Delta x$. This integrated optical component in effect makes it possible to reduce the physical space between the paths. This type of concentrator is particularly well suited for use in planar wave guide AWG (Array Wave Guide Grating) multiplexers/demultiplexers. However, it is relatively expensive.

Another method consists in increasing $\omega$. Thus, document EP 0 859 249 describes a fiber optics multiplexer comprising basic input fibers each carrying a frequency band and an array of microlenses, each microlens being associated with one fiber end. These microlenses make it possible to converge the beams coming from the basic fibers to produce parallel beams with a larger mode field radius than that of the input beams. The beams pass through a collimation lens that directs them toward a dispersion grating making it possible to generate a single output beam consisting of different superimposed beams.

It will be understood that this technique requires precise positioning of the ends of the fibers with respect to the focal points of the microlenses as well as precise alignment of the axes of the basic fibers with respect to the focal axes of the microlenses.

One goal of this invention is to provide an optical fiber multiplexer/demultiplexer that is more economical, easy to assemble and has an enhanced FWHM/$\Delta\lambda$ ratio.

To this end, the invention proposes an optical component comprising at least one input monomode fiber, at least one output monomode fiber and a diffractive element positioned between the input fiber or fibers and the output fiber or fibers, characterized in that at least one of the input or output fibers comprises a fiber comprising a portion designed to increase the mode field radius it guides.

Within the framework of this invention, the portion designed to increase the mode field radius of the beam may be formed of a portion with a graded index.

This type of optical component advantageously makes it possible to obtain a beam whose mode field radius is increased with respect to the mode field radius carried by the associated guiding element.

In this component, the mode field radius expansion function of each beam is advantageously integrated in the input fiber and/or output fiber of this beam.

BRIEF DESCRIPTION OF THE DRAWINGS

Other features and advantages will become clear upon reading the following description, which is purely illustrative and non-limiting in nature and which must be read in light of the appended figures.

FIG. 3 represents a fiber example comprising a portion with a graded index.

DETAILED DESCRIPTION OF ILLUSTRATIVE EMBODIMENTS

Of course this invention is not limited to the particular number of fibers illustrated in the appended figures, particularly to a 4 to 1 multiplexer, but extends to any component comprising n fibers.

Figure 1:
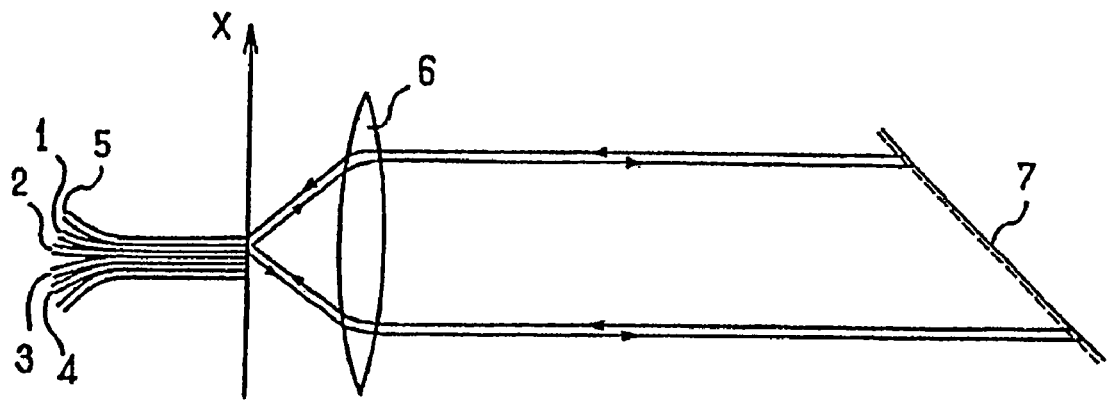
FIG. 1 is a schematic representation of a multiplexer/demultiplexer with a diffractive element of the prior art.
Figure 2:
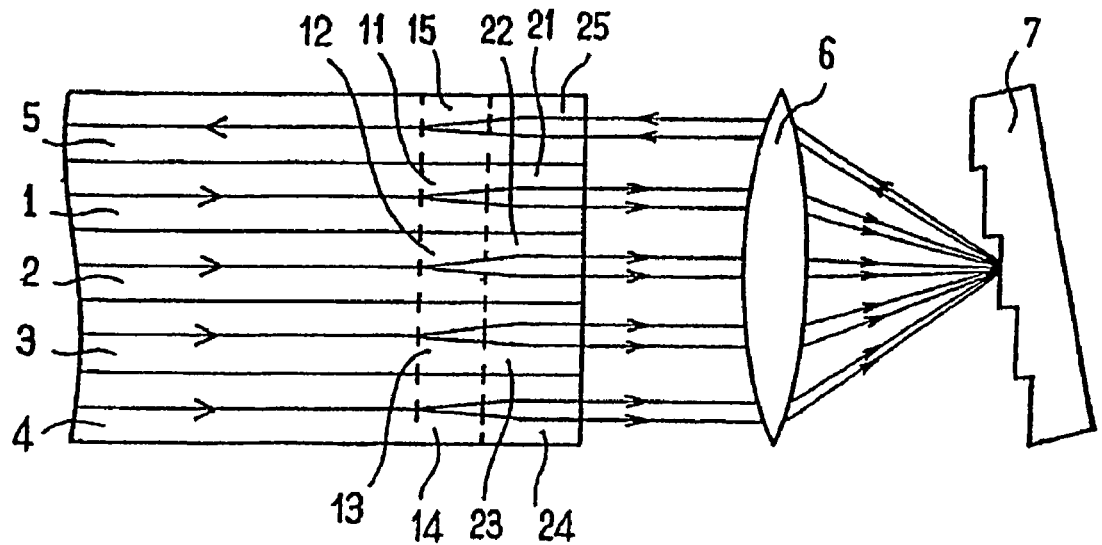
FIG. 2 is a schematic representation of a multiplexer/demultiplexer that conforms to a mode of embodiment of the invention.

The component represented in FIG. 2 operates like a multiplexer (this type of component could, of course, also be used as a demultiplexer). This component comprises coplanar optical fibers 1 to 5 that are parallel to one another and juxtaposed. Fibers 1 to 4 are input fibers, each dedicated to a given frequency band. Fiber 5 is an output fiber ensuring the transmission of the multiplexed optical beam obtained by superimposing the beams coming from the input fibers 1 to 4. The component also comprises a focusing element 6 of the lens type placed opposite the ends of fibers 1 to 5 and a diffractive element 7, for example a diffraction grating, that receives the signals coming from the input fibers 1 to 4 via the focusing element 6.

In known manner, the diffraction element 7 has the property of sending back the different wavelengths contained in the same incident beam separated angularly. Pursuant to the principle of light return, the grating can recombine the incident beams separated angularly and coming from the input fibers 1 to 4 in the direction of the output fiber 5 via the focusing element 6.

The input fibers 1 to 4 and the output fiber 5 have respectively at their end a silica portion 11 to 14 and 15 as well as an optical fiber portion with graded refractive index 21 to 24 and 25. The portions of graded refractive index fiber have a core whose refractive index varies based on the radial distance. The refractive index, higher at the center of the core, decreases as we approach the optical cladding, thus forcing the light rays to follow a curved trajectory that periodically refocuses on the central axis of the core. In a graded refractive index optical fiber, the refractive index of the fiber changes according to a determined continuous refractive index variation law, for example parabolic. Thus, the tilted ray moving away from the axis encounters a refractive index environment that decreases progressively which lays it down and brings it back toward the axis.

In this figure, the beams coming from the graded index portions travel in the void up to the focusing element 6, which focuses them on the element 7. Each beam corresponds to a given frequency range, and the grating is adapted to superimpose all the incident beams into a single beam directed toward the focusing element 6 and the output fiber 5.

In FIG. 3, we have illustrated more specifically an example of fiber 1 comprising a graded refractive index portion. This type of fiber is formed of a classic monomode fiber 31 at the end of which has been spliced a silica segment 11 of length Ls followed by a graded refractive index fiber segment 21 with length Lg constituting the graded refractive index portion. The beams coming from the core of the monomode fiber 31 successively pass through the pure silica segment 11 and the graded refractive index segment 21. In the pure silica segment 11, the beams have a tendency to diverge while in the graded refractive index silica segment 21, they have a tendency to reconcentrated. The working distance $z_\omega$ and the mode field radius ω of the beam leaving the fiber depend on the lengths Ls and Lg of the segments 11 and 21 spliced to the monomode fiber 31.

It is also possible to use similar fibers that do not comprise the pure silica segment 11. In this case, the monomode fiber 31 is directly spliced to the graded refractive index fiber segment 21.

In one implementation of the multiplexer of FIG. 2, the input fibers 1 to 4 and the output fiber 5 consists of monomode fibers 31 to 35 with a constitution similar to the one in FIG. 3.

The basic fibers 1 to 5 of FIG. 2 can be positioned in a fiber holder comprising V-shaped grooves for positioning the fibers. The ends of fibers 1 to 5 are then polished to be aligned with one another. The polishing operation slightly modifies the length of the graded-index fiber portions 21 to 25. We can show that this modification in length has few consequences for the mode range ω of the beam leaving the fiber.

Nevertheless, to precisely control the behavior of the beam, it is possible to add an additional silica segment at the end of each fiber 1 to 5 without any effect on the trajectory of the beams. The fibers are then positioned in the fiber holder with this additional segment before being polished together. In this way, the length of the graded-index portions 21 to 25 is not altered by the polishing operations.

We can also obtain enhanced performance by reducing the diameter of the fibers at their end. To this end, we can advantageously produce a chemical attack of their external surfaces to remove a layer of the optical cladding. We thus decrease the value of the spacing Δx between the mode field radii.

Furthermore, the invention makes it possible to eliminate the alignment problems inherent in the prior art.

Previously we described components according to the invention in which the portion designed to increase the mode field radius of the beam is formed of a portion with a graded refractive index. However, the invention is not limited to this particular mode of embodiment. As indicated previously, this invention also extends to the case where the portion ensuring the mode increase is formed of a portion of fiber whose core or cladding size varies longitudinally and/or transversally or even of a portion whose core or cladding refractive index varies longitudinally and/or transversally.

Additionally, it will be understood that the invention is not limited to the modes of embodiment previously described in which the diffractive element consists of a diffraction grating. For example, the diffractive element may consist of an echelle grating, a volume-phase holographic grating, a prism, or even the combination of several of these elements.

The invention claimed is:

1. An optical component comprising at least one input monomode fiber (1-4), at least one output monomode fiber (5), a diffractive element (7) positioned between the input fiber or fibers (1-4) and the output fiber or fibers (5), and a focusing element (6) placed, between the ends of the fibers (1-5) and the diffractive element (7), characterized in that at least one of the input or output fibers (1-5) comprises a graded-index portion (21-25) designed to increase the radius of the mode field it guides for an enhancement of the FWHM/Δλ ratio and that the focusing element (6) is separated from the fibers.

2. The component as claimed in claim 1, wherein the portion (21-25) designed to increase the mode field radius is formed of a segment(s) of fiber added and spliced to the end of the fiber (1-5).

3. The component as claimed in claim 1, wherein the component forms a wavelength multiplexer/demultiplexer.

4. The component as claimed in claim 3, wherein the diffractive element (7) receives the incident beams from a plurality of input fibers (1-4), the diffractive element (7) combines those incident beams into a single beam and sends this single beam to at least one output fiber (5).

5. The component as claimed in claim 3, wherein the diffractive element (7) receives an incident beam containing different wavelengths from at least one input fiber (5), the diffractive element (7) separates the incident beam angularly and sends the beams separately to output fibers (1-4).

6. The component as claimed in claim 1, wherein the fiber or fibers (1-5) also comprise a pure silica portion positioned between the end of the fiber (31) and the fiber portion ensuring the increase in the mode field radius (21-25).

7. The component as claimed in claim 1, wherein each fiber (1-5) comprising a portion designed to increase the mode field radius has at its end a protective silica portion connected to the fiber portion ensuring the increase of the mode field radius (21-25), said protective silica portions can be polished without the risk of modifying the length of the fiber portion ensuring the increase of the mode field radius (21-25).

8. The component as claimed in claim 1, wherein the diameter of the end of the fiber or fibers (1-5) comprising at least one fiber portion ensuring the increase of the mode field radius (21-25) is reduced by chemical attack of the external surfaces of the fibers.

9. The component as claimed in claim 1, wherein the diffractive element (7) is chosen from the group consisting of echelle gratings, volume-phase holographic gratings, prisms or a combination of these elements.

10. The component as claimed in claim 1, wherein the focusing element is a lens spatially separated from the input and output fibers.

* * * * *

UNITED STATES PATENT AND TRADEMARK OFFICE
CERTIFICATE OF CORRECTION

PATENT NO. : 7,336,868 B2
APPLICATION NO. : 10/491645
DATED : February 26, 2008
INVENTOR(S) : Jean-Baptiste Fouche Page 1 of 1

It is certified that error appears in the above-identified patent and that said Letters Patent is hereby corrected as shown below:

In column 1, line 39 please delete "$\omega/\Delta\lambda$", and in its place --$\omega/\Delta x$--.

Signed and Sealed this

First Day of September, 2009

David J. Kappos
*Director of the United States Patent and Trademark Office*